(12) United States Patent
Anderson et al.

(10) Patent No.: US 9,782,766 B2
(45) Date of Patent: Oct. 10, 2017

(54) REGENERATION PROCESS FOR METAL CATALYST BASED GAS PURIFIERS

(71) Applicant: Corning Incorporated, Corning, NY (US)

(72) Inventors: Erling Richard Anderson, Wilmington, NC (US); Stephen Mitchell Carlton, Rocky Point, NC (US); Steven Bruce Dawes, Corning, NY (US); John Michael Jewell, Wilmington, NC (US); Roger Alan Rose, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/375,843

(22) Filed: Dec. 12, 2016

(65) Prior Publication Data

US 2017/0173575 A1    Jun. 22, 2017

Related U.S. Application Data

(60) Provisional application No. 62/269,279, filed on Dec. 18, 2015.

(51) Int. Cl.
| | | |
|---|---|---|
| *B01J 38/10* | (2006.01) | |
| *B01J 23/94* | (2006.01) | |
| *B01J 23/90* | (2006.01) | |
| *B01J 29/90* | (2006.01) | |

(52) U.S. Cl.
CPC .............. *B01J 38/10* (2013.01); *B01J 23/90* (2013.01); *B01J 23/94* (2013.01); *B01J 29/90* (2013.01)

(58) Field of Classification Search
CPC ... B01J 38/10; B01J 23/90; B01J 23/94; B01J 29/90
USPC .......................................................... 502/53
See application file for complete search history.

(56) References Cited

U.S. PATENT DOCUMENTS 4,361,495 A   11/1982  Hort
5,902,561 A    5/1999  Carrea

FOREIGN PATENT DOCUMENTS

JP         3012315      1/1991
WO      2013119883      8/2013

OTHER PUBLICATIONS

Den Besten, et.al., "The Mechanisms of Chemisorption: Carbon Monoxide and Carbon Dioxide", Trans.Amer.Chem. Soc., 66, p. 450-453, Mar. 1962.

*Primary Examiner* — Edward Johnson
(74) *Attorney, Agent, or Firm* — Kevin L. Bray

(57) ABSTRACT

Disclosed herein are methods for regenerating metal catalysts used in the purification of inert gases for use in fiber draw furnaces and other applications. The methods described herein can regenerate metal catalysts alone or in combination with molecular sieves. The methods disclosed herein are able to prevent the formation and retention of unwanted byproducts during and after the regeneration process, thereby efficiently converting oxidized catalysts to their reduced or elemental form. Gases purified with catalysts regenerated by the methods disclosed herein, when used in fiber draw furnaces and similar applications, can lead to extended equipment lifetimes and higher-quality products due to the lack of degradation by contaminants in the gas stream.

26 Claims, 4 Drawing Sheets

REGENERATION PROCESS FOR METAL CATALYST BASED GAS PURIFIERS

This application claims the benefit of priority under 35 U.S.C. §119 of U.S. Provisional Application Ser. No. 62/269,279 filed on Dec. 18, 2015 the content of which is relied upon and incorporated herein by reference in its entirety.

BACKGROUND

Inert gases such as helium, argon, and nitrogen are routinely used in laboratory and industrial applications to prevent the oxidation of chemical species or of the materials used in the construction of equipment. Because these gases are produced via separation techniques, they can be expensive, and methods for their usage reduction and/or recycling are commonly employed. For most recycling methods, purification of the gas prior to reuse is required.

When purification requires the removal of oxygen-containing species ($O_2$, $CO_2$, CO, $H_2O$, etc.), a well-known method for purification is to expose the "used" or impure gas to a metal-based catalyst such as nickel, which reacts to trap the oxide species via chemisorption and/or oxidation. Typically, when the reaction sites on the catalyst are consumed, the catalyst is regenerated for reuse.

In the case of nickel gas purifiers, chemisorption reactions are reversed by exposing the nickel to hydrogen gas, such that the metal is returned to its base or elemental form via the following reactions:

$$Ni(CO)_x + 3xH_2 \rightarrow Ni + xCH_4 + xH_2O$$

$$NiO + H_2 \rightarrow Ni + H_2O$$

$$Ni(CO)_x + xH_2 \rightarrow Ni + x/2 CH_4 + x/2 CO_2$$

Purge gases are commonly used in fiber draw furnaces constructed with graphite materials for the formation of optical fibers in order to prevent damage to the furnace by room air intrusion. Upon exiting a draw furnace, the typical furnace purge (helium and argon) contains trace amounts of carbon monoxide (200-600 ppm) and 1-10 ppm HCl and/or chlorine gas. When this purge is collected for recycling, typically, some amount of nitrogen, carbon dioxide, oxygen, and water are collected with the target purge gas, the concentration of these gases being dependent on the design of the collection system and the collection rate/flow. Impurities in the purge gases used in such furnaces can result in accelerated oxidation of the materials used for the construction of the draw furnace. Over time, this oxidation leads to end products of lesser quality and/or the need for costly replacement parts and repairs. Further, chlorine compounds need to be removed from the draw furnace to prevent buildup or concentration in the recycled gas stream and associated corrosion damage.

Commercial nickel catalyst gas regeneration systems, when used as directed, can leave behind undesirable byproducts which in turn can release gaseous impurities into the processed gases at concentrations of over 500 parts per million. What is needed is a more thorough and effective method of regenerating the nickel catalyst such that fewer impurities are present in the end product.

SUMMARY

Disclosed herein are methods for regenerating metal catalysts used in the purification of inert gases for use in fiber draw furnaces and other applications. The methods described herein can regenerate metal catalysts alone or in combination with molecular sieves. The methods disclosed herein are able to prevent the formation and retention of unwanted byproducts during and after the regeneration process, thereby efficiently converting oxidized catalysts produced by impurities present in a gas stream to their reduced or elemental form. Gases purified with catalysts regenerated by the methods disclosed herein, when used in fiber draw furnaces and similar applications, can lead to extended equipment lifetimes and higher-quality products due to the lack of degradation by contaminants in the gas stream.

The advantages of the invention will be set forth in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
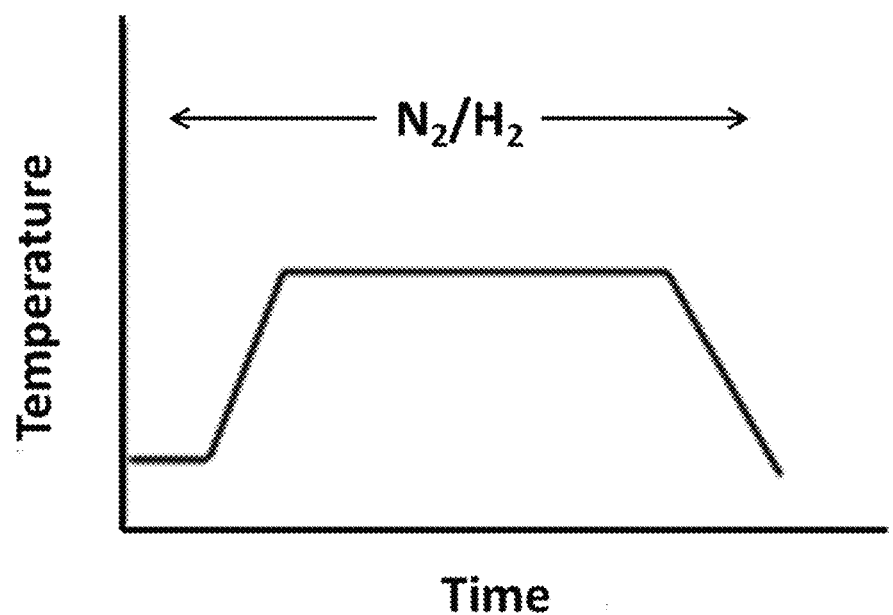
FIG. 1 shows a regeneration cycle where a gaseous mixture of nitrogen and hydrogen is flowing throughout the cycle.

Before the present compounds, compositions, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In the specification and in the claims that follow, reference will be made to a number of terms that shall be defined to have the following meanings.

It must be noted that, as used in the specification and appended claims, the singular forms "a," "an," and "the" include plural referents unless the context clearly dictates otherwise. Thus, for example, "an inert gas" includes mixtures of two or more such gases, and the like.

The term "impurity" is any compound that can oxidize or adsorb on the metal catalyst. For example, the impurity can be a small molecule that might be present in a gas stream passed over the metal catalyst. Examples of such compounds include, but are not limited to, HCl, ammonia, water, carbon dioxide, carbon monoxide, oxygen, chlorine gas, and the like, as well as mixtures thereof.

The term "temperature" with respect to heating and cooling the metal catalyst refers to the external temperature of the environment where the metal catalyst is present. For example, when the metal catalyst is heated to 300° C. in a closed vessel, the atmospheric temperature inside the vessel is 300° C. Similarly, when the metal catalyst is cooled to a particular temperature after heating, this temperature is also the atmospheric temperature where the catalyst is present.

"Oxidation" as used herein refers to the chemical combination of a substance, such as a metal catalyst, with oxygen, and/or a chemical reaction in which an atom or ion loses electrons. "Chemisorption," meanwhile, is the reaction between a surface, such as a catalyst surface, and an adsorbate, in which new chemical bonds are formed on the surface.

"Regeneration" of a metal catalyst involves the use of chemical and physical processes to restore the metal catalyst to its elemental or zero oxidation state such as, for example, by the methods disclosed herein. In one aspect, the degree of regeneration can be measured by the metal catalyst's ability to remove impurities from a gas stream. The metal catalysts regenerated using the methods described herein can remove impurities from a gas stream below the detection limits of FTIR. The table below provides the detection limits of FTIR of several impurities.

| Impurity | FTIR Detection Limit |
| --- | --- |
| Ammonia | 1 ppm |
| Carbon Monoxide | 0.5 ppm |
| Carbon Dioxide | 2.0 ppm |
| Methane | 0.5 ppm |
| Water | 1.5 ppm |
| Hydrochloric acid | 0.5 ppm |

Thus, the methods described herein regenerate a catalyst such that less than 1 ppm of ammonia, less than 0.5 ppm carbon monoxide, less than 2.0 ppm carbon dioxide, less than 0.5 ppm methane, less than 1.5 ppm, and less than 0.5 hydrochloric acid is present in the gas stream after the stream is contacted with the regenerated catalyst.

Provided herein are methods for regenerating a metal catalyst used for gas purification. In one aspect, the method involves exposing the metal catalyst to a hydrogenation composition containing at least hydrogen gas and a first inert gas under heat having a first temperature and further performing one or both of the following steps:

(a) prior to exposing the metal catalyst to the hydrogenation composition, exposing the metal catalyst to a second inert gas in the absence of hydrogen gas, and/or
(b) after exposing the metal catalyst to the hydrogenation composition, exposing the metal catalyst to a third inert gas in the absence of hydrogen gas.

Each step of the methods described herein and components used in the methods is described in detail below.

Metal Catalyst

In one aspect, the methods disclosed herein are used to regenerate a metal catalyst. "Metal catalyst" as used herein refers to a substance, usually used in a small amount that increases the rate of a reaction without being consumed or destroyed during the reaction. While the metal catalyst is not consumed or destroyed, in some aspects, it may become oxidized through interaction with oxygen-containing species such as, for example water, oxygen, carbon monoxide, carbon dioxide, peroxides, it may chemisorb contaminants, or some combination thereof. As more sites on the metal catalyst are oxidized and/or blocked through chemisorption, the metal catalyst becomes less efficient. Gases treated with an oxidized or blocked metal catalyst have higher levels of impurities than those treated with an unreacted metal catalyst in its elemental or zero oxidation state.

In one aspect, the metal catalyst is a transition metal or transition metal alloy. In another aspect, the metal catalyst is nickel, iron, copper, titanium, zirconium, palladium, or any combination thereof. In another aspect, the metal catalyst is used in conjunction with molecular sieves. In a further aspect, the metal catalyst and molecular sieves are incorporated into the same purification bed. In an alternative aspect, the molecular sieves can be removed and placed separately from the metal catalyst. In a still further aspect, the regeneration process for the metal catalyst also serves to regenerate the molecular sieves. Without wishing to be bound by theory, in some aspects, an isothermal hold step at elevated temperature causes contaminants that have been adsorbed by the molecular sieves to vaporize; these then exit the system with the purge gas. In one aspect, the molecular sieves remove chlorides and water from the system via an adsorption mechanism.

Inert Gas

In one aspect, one or more inert gases are be used in the processes disclosed herein. Inert gases include, but are not limited to, nitrogen, argon, helium, and combinations thereof. In some aspects, an inert gas may be used to purge impurities, contaminants, or other vaporized components from the system once they are released from the catalyst bed. In these aspects, the inert gas may also be referred to as a "purge gas."

In other aspects, an inert gas can be a carrier gas. In these aspects, the carrier gas is mixed with a reactive gas such as hydrogen gas. Without wishing to be bound by theory, hydrogen gas in high concentrations (of 5.2% and higher) can be flammable and introduction of the carrier gas can increase the flow rate and penetration of hydrogen gas into the system without sacrificing worker safety and equipment function.

In one aspect, the inert gases are highly pure. Further in this aspect, the inert gases can be greater than or equal to 99.999% pure. In some aspects, using highly pure inert gases in the methods disclosed herein ensures that additional contaminants are not deposited in the metal catalyst bed during regeneration.

Methods for Regenerating Gas Purification Metal Catalysts

In all of the methods described herein, the metal catalyst is exposed to a hydrogenation composition containing at least hydrogen gas and a first inert gas under heat having a first temperature.

In one aspect, heating the metal catalyst with a target (i.e., first) temperature ranging from about 200 to about 400° C.

drives desorption of CO from the metal catalyst. This is depicted in the equation below when the metal catalyst is nickel:

$$Ni(CO)_x \rightarrow Ni(CO)_{x-1} + CO \quad (1)$$

as well as driving desorption of water, HCl, and chlorine from molecular sieves associated with the catalyst bed.

In another aspect, the reduction of the metal catalyst (e.g., nickel) by hydrogen gas generates methane, water, and carbon dioxide via the reactions below:

$$Ni(CO)_x + 3xH_2 \rightarrow Ni + xCH_4 + xH_2O \quad (2)$$

$$NiO + H_2 \rightarrow Ni + H_2O \quad (3)$$

$$Ni(CO)_x + xH_2 \rightarrow Ni + (x/2)CH_4 + (x/2)CO_2 \quad (4)$$

In yet another aspect, when nitrogen is used as the carrier gas, the catalyzing capability of the metal catalyst (e.g., nickel) also promotes the formation of ammonia:

$$N_2 + 3H_2 \rightarrow 2NH_3 \quad (5)$$

In a further aspect, the first temperature at which the metal catalyst is exposed to the hydrogenation composition can be from about room temperature to about 300° C. In another aspect, the temperature is 20° C., 50° C., 100° C., 150° C., 180° C., 200° C., 250° C., or 300° C., where any value can be a lower and upper endpoint of a range (e.g., 50° C. to 250° C.). The duration the metal catalyst is exposed to the hydrogenation composition can vary depending upon conditions such as, for example, the volume of the metal catalyst, the degree of oxidation on the catalyst, and the flow rate of the hydrogenation composition. In one aspect, the metal catalyst is exposed to the hydrogenation composition for a period of time ranging from 1 to 48 hours or more.

The amount of hydrogen gas present in the hydrogenation composition can also vary. For example, the rate of regeneration can be modulated (i.e., decreased or increased) by varying the concentration of hydrogen gas present in the hydrogenation composition. In one aspect, the amount of hydrogen gas present in the hydrogenation composition is less than the flammability limit (e.g., less than 5.2% hydrogen gas). In any of the previous aspects, hydrogen gas is present in the hydrogenation composition at a concentration less than or equal to 5 vol %. In another aspect, the amount of hydrogen gas present in the hydrogenation composition is 0.1 vol %, 0.2 vol %, 0.3 vol %, 0.4 vol %, 0.5 vol %, 1 vol %, 1.5 vol %, 2 vol %, 2.5 vol %, 3 vol %, 3.5 vol %, 4 vol %, 4.5 vol %, or 5 vol %, where any value can be a lower and upper endpoint of a range (e.g., 0.5 vol % to 5 vol %). In other aspects, where the equipment used in the regeneration process is safe to handle higher concentrations of hydrogen gas, the concentration of hydrogen gas in the hydrogenation composition can be greater than the flammability limit. In some aspects, the first inert gas in the hydrogenation composition is nitrogen, argon, or a mixture thereof.

In some aspects described herein, the hydrogenation composition has a flow rate of from about 7.5 to about 10 standard liters per minute (slpm) and the metal catalyst has a bed volume of from about 7.2 to about 10.9 liters. In some aspects, the flow rate of the hydrogenation composition is proportional to the size of the metal catalyst bed, with larger catalyst beds requiring higher flow rates. In other aspects, the flow rate and time are selected not only based on bed volume, but also reaction stoichiometry, mass transfer, reaction rate limitations within the purification bed, and like factors. In these aspects, flow rate and time are bed configuration dependent and must be determined empirically by the technician.

Depending upon the impurities in the gas stream to which the metal catalyst was exposed, steps (a) and/or (b) are performed. In one aspect, the methods disclosed herein can be used to remove chlorine-containing species from the metal catalyst. In this embodiment, the metal catalyst is (1) is exposed to a second inert gas in the absence of hydrogen gas, (2) next exposed to the hydrogenation composition containing at least hydrogen gas and a first inert gas under heat having a first temperature, and (3) exposed to a third inert gas in the absence of hydrogen gas. In this aspect, steps (a) and (b) are performed. An example of this method is depicted in FIG. 1.

In one aspect, the second and third inert gases are, independently, argon, nitrogen, or a mixture thereof. In another aspect, the second inert gas is argon and third inert gas is argon or nitrogen.

In another aspect, in the presence of the second inert gas, the metal catalyst is heated from an initial temperature to a temperature less than or equal to the first temperature when the metal catalyst is exposed to the hydrogenation composition. In this aspect, the metal catalyst is heated for a period of time ranging from 30 minutes to about 2 hours at a temperature of from room temperature to 300° C. in the presence of the second inert gas prior to exposure with the hydrogenation composition. In another aspect, the temperature is 20° C., 50° C., 100° C., 150° C., 180° C., 200° C., 250° C., or 300° C., where any value can be a lower and upper endpoint of a range (e.g., 50° C. to 250° C.).

In still another aspect, in the presence of the third inert gas, the metal catalyst is cooled from a temperature of about 300° C. to about room temperature after the metal catalyst is exposed to the hydrogenation composition. In another aspect, the metal catalyst is cooled to a temperature of 20° C., 50° C., 100° C., 150° C., 200° C., 250° C., or 300° C., where any value can be a lower and upper endpoint of a range (e.g., 50° C. to 250° C.). In a further aspect, the cooling takes place over a time ranging from 1 to about 4 hours.

Without wishing to be bound by theory, in this aspect, the use of argon during heating will prevent the formation of ammonium chloride by driving off volatile, chlorine-containing gases before the introduction of hydrogen gas and the first inert gas. Further in this aspect, elimination of nitrogen and hydrogen gas during heating allows HCl to desorb without forming significant levels of ammonia, thereby reducing the formation of ammonium chloride. In another aspect, eliminating hydrogen gas from the cool down eliminates the formation or condensation of hydrogen-containing compounds as well as hydrogen gas adsorption.

Figure 2:
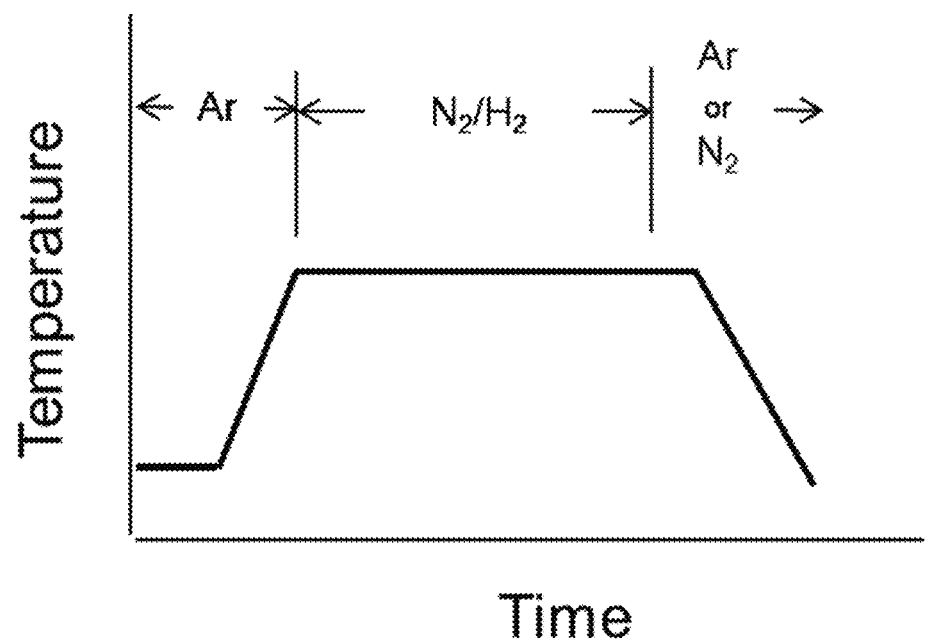
FIG. 2 shows a regeneration cycle wherein the metal catalyst is purged with argon as the system temperature increases, regenerated for an interval with a mixture of nitrogen and hydrogen gas, and purged again with argon or nitrogen as the system temperature is returned to its initial state.

In other aspects, only step (b) is performed after the metal catalyst is exposed to the hydrogenation composition. In one aspect, after the metal catalyst has been exposed to the hydrogenation composition, the metal catalyst is exposed to a third inert gas in the absence of hydrogen gas. An example of this method is depicted in FIG. 2.

In one aspect, the third inert gas is argon, nitrogen, or a mixture thereof.

In another aspect, in the presence of the hydrogen gas and the first inert gas, the metal catalyst is heated from an initial temperature to a temperature less than or equal to the first temperature. In this aspect, the metal catalyst is heated for a period of time ranging from 30 minutes to about 2 hours at a temperature of from room temperature to 300° C. In another aspect, the temperature is 20° C., 50° C., 100° C., 150° C., 180° C., 200° C., 250° C., or 300° C., where any value can be a lower and upper endpoint of a range (e.g., 50° C. to 250° C.).

In another aspect, in the presence of the third inert gas, the metal catalyst is cooled to a temperature of from about 300° C. to about room temperature. In another aspect, the metal catalyst is cooled to a temperature of 20° C., 50° C., 65° C. 100° C., 150° C., 200° C., 250° C., or 300° C., where any value can be a lower and upper endpoint of a range (e.g., 50° C. to 250° C.). In a further aspect, the cooling takes place over a time ranging from 1 hour to about 4 hours. Not wishing to be bound by theory, the absence of hydrogen gas during the cool down eliminates the formation or condensation of hydrogen containing compounds as well as hydrogen gas adsorption.

In this aspect, the method disclosed herein can be used when it is known that the purification bed is free of chlorine. In this aspect, lack of chlorine in the system eliminates the possibility of ammonium chloride formation, which in turn simplifies and shortens the metal catalyst regeneration process.

In another aspect, step (b) can be performed after the metal catalyst is exposed to the hydrogenation composition when the purification system is to be brought back online after a period of disuse. In this aspect, cycle times can be extended to more thoroughly drive impurities from the system.

Figure 3:
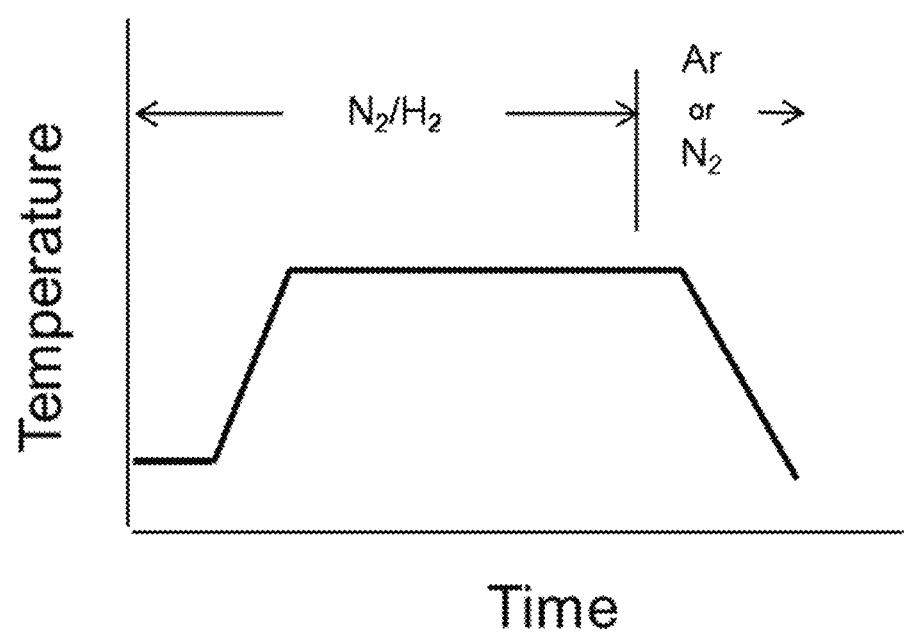
FIG. 3 shows a regeneration cycle wherein the metal catalyst is regenerated with a mixture of nitrogen and hydrogen gas as the system temperature increases and for an interval of time following that, then purged with argon or nitrogen as the system temperature is returned to its initial state.

In this embodiment, the metal catalyst is (1) exposed to the hydrogenation composition containing at least hydrogen gas and a first inert gas under heat having a first temperature, (2) the metal catalyst is next cooled in the presence of the hydrogenation composition, and (3) next heating the metal catalyst in the presence of a third inert gas in the absence of hydrogen gas. An example of this method is depicted in FIG. 3.

In one aspect, the third inert gas is argon, nitrogen, helium, or a mixture thereof.

In another aspect, in the presence of the hydrogen gas and the first inert gas, the metal catalyst is heated from an initial temperature to a temperature less than or equal to the first temperature. In this aspect, the metal catalyst is heated for a period of time ranging from 30 minutes to about 2 hours at a temperature of from room temperature to 300° C. In another aspect, the temperature is 20° C., 50° C., 100° C., 150° C., 180° C., 200° C., 250° C., or 300° C., where any value can be a lower and upper endpoint of a range (e.g., 50° C. to 250° C.). After the initial heating step, the metal catalyst is cooled to a temperature of from about 300° C. to about room temperature in the presence of the hydrogenation composition. In another aspect, the metal catalyst is cooled to a temperature of 20° C., 50° C., 65° C., 100° C., 150° C., 200° C., 250° C., or 300° C., where any value can be a lower and upper endpoint of a range (e.g., 50° C. to 250° C.). In a further aspect, the cooling takes place over a time ranging from 1 hour to about 4 hours.

After the initial heating and cooling cycle, the metal catalyst is first heated in the presence of the third inert gas from an initial temperature to a temperature less than or equal to the temperature in the first heating cycle (i.e., the first temperature). In one aspect, the second heating cycle is over a period of time ranging from 30 minutes to about 2 hours at a temperature of from about room temperature to less or equal to 200° C. In another aspect, the temperature is 20° C., 50° C., 100° C., 150° C., 180° C., or 200° C., where any value can be a lower and upper endpoint of a range (e.g., 50° C. to 150° C.). Not wishing to be bound by theory, this second thermal cycle serves to volatilize and drive off any unwanted compounds or gases. After the second heating step in the presence of the third inert gas, the metal catalyst is subsequently cooled to a temperature of from about 200° C. to about room temperature over a time ranging from 1 hour to about 4 hours. In another aspect, the metal catalyst is cooled to a temperature of 20° C., 50° C., 65° C., 100° C., 150° C., or 200° C., where any value can be a lower and upper endpoint of a range (e.g., 50° C. to 250° C.).

In some aspects, the same method may be repeated more than once, or multiple methods may be used in combination. In other aspects, gas purges with inert gases may be accompanied by low pressure evacuations to clear purge gases and any associated impurities or contaminants from the catalyst bed.

As discussed above, the purification vessel and effluent stream contain a broad range of gaseous impurities including, but not limited to, oxygen-containing species (e.g., water, carbon monoxide, and carbon dioxide), methane, HCl, ammonia, and chlorine that can oxidize the reduced or elemental form of the catalyst. In some aspects, these gases, in combination with supplied but not fully reacted hydrogen gas and nitrogen can and do form unwanted semi-volatile compounds such as ammonium chloride and ammonium carbonate, which subsequently absorb water. When compounds like $NH_4Cl$ and $(NH_4)_2CO_3$ are left behind in the purification vessels, they subsequently release undesirable gases ($CO_2$, $H_2O$, HCl, $NH_3$ and $H_2$) into the recycled gas stream when the vessel is switched to purification mode. The release of these gases, even at low levels, makes the purification system less efficient after regeneration. Specifically for a fiber draw furnace application, these gases can accelerate the oxidation of the graphite used in the high temperature regions of the furnace, reducing furnace life and degrading both draw process performance and fiber quality.

In one aspect, the methods described herein prevent the formation of undesirable semi-volatile compounds such as $NH_4Cl$ and $(NH_4)_2CO_3$ by purging the metal catalyst in the purification vessel with an inert gas at a temperature greater than the condensation point of the compound (e.g., ~180° C. for $NH_4Cl$) such that when temperature falls below the condensation point, there is insufficient concentration of gases (e.g., $NH_3$) remaining. In the case when impurities such as $NH_4Cl$ and $(NH_4)_2CO_3$ do form and condense, they can be removed by heating the metal catalyst above the vaporization point and purging with an inert gas. In one aspect, the methods described herein removes $NH_3$ to <20 ppb at room temperature from the metal catalyst.

In one aspect, commercial equipment capable of holding metal catalysts and receiving gas flow can be used in the methods described herein. In one aspect, a single catalyst bed can be used for gas purification until the catalyst is exhausted, then the catalyst bed can be taken offline and regenerated.

In another aspect, parallel metal catalyst beds can be installed in the same piece of equipment. In this aspect, a first metal catalyst bed can be used for gas purification until the catalyst is exhausted, then gas purification can be switched to a second or subsequent metal catalyst bed while the first metal catalyst bed is regenerated. In this way, the equipment can be continually operating to purify gases and regenerate metal catalysts, reducing instrument or process equipment downtime.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by volume, temperature is in ° C. or is at ambient temperature, and pressure is at or near atmospheric. There are numerous variations and combinations of reaction conditions, e.g., component concentrations, desired solvents, solvent mixtures, temperatures, pressures, and other reaction ranges and conditions that can be used to optimize the various methods describe herein. Only reasonable and routine experimentation will be required to optimize such process conditions.

Example 1

Comparative Protocol

A nickel catalyst incorporated in a bed with molecular sieves was regenerated using a process similar to that described in prior art. An $H_2/N_2$ mixed flow was started at approximately 10 standard liters per minute (slpm). The bed was then heated to 300° C. and held isothermally at this temperature for 48 hours, and cooled to room temperature at a rate determined by the inherent heat loss of this system. The $H_2/N_2$ mixed flow was stopped after the bed reached room temperature. This procedure is depicted in FIG. 1.

Gas purification attempts after this regeneration procedure resulted in the presence of impurities evolving from the catalyst bed at levels of from 100 ppm to over 500 ppm. When the gas containing these impurities was subsequently used in a fiber draw furnace, these impurities caused accelerated oxidation of the graphite materials used for the construction of the draw furnace.

Example 2

New Protocol

Over the course of one hour, a nickel catalyst was heated to 300° C. in the presence of an argon flow. The system was subjected to an isothermal 300° C. hold for 5 hours under a flow of 5% $H_2$/95% $N_2$. The flow of gas was then switched to nitrogen and the isothermal hold was continued for 1 hr. The system was then cooled to room temperature over a period of four hours under nitrogen. This procedure is depicted in FIG. 2. In some experiments, the cooling was conducted under argon.

Example 3

New Protocol, No Initial Inert Gas Purge

This experiment was conducted following the protocol of Example 2, but the initial heating was conducted under a flow of 5% $H_2$/95% $N_2$ which was then continued for the first 5 hours of the isothermal hold, after which time the flow of gas was switched to nitrogen for the remaining 1 hr of the isothermal hold. This procedure is depicted in FIG. 3.

Example 4

New Protocol, Separate Heat Cycle for Inert Gas Purge

Figure 4:
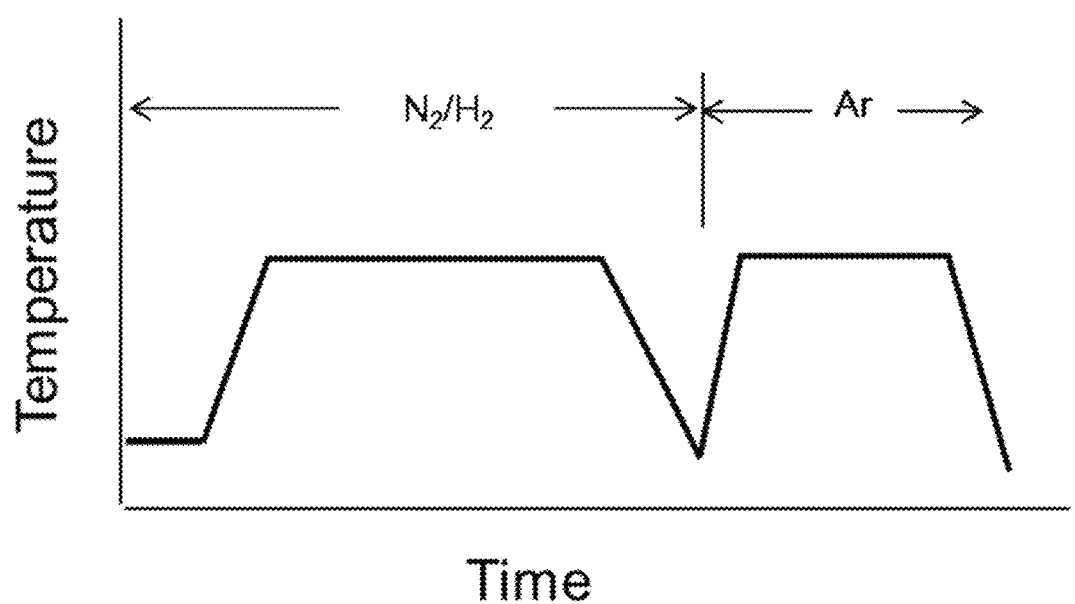
FIG. 4 shows a regeneration cycle wherein the metal catalyst is regenerated with a mixture of nitrogen and hydrogen gas as the system temperature increases, for an interval of time following that, and during the decrease of the system temperature to its initial state. Following this regeneration, the system is purged with argon throughout a second temperature cycle.

This experiment was conducted following the protocol of Example 3; however, 5% $H_2$/95% $N_2$ flow was maintained for the entire isothermal hold, and the system was cooled under the flow of 5% $H_2$/95% $N_2$, followed by a separate heating cycle to 300° C. under a flow of argon. The duration of the second isothermal hold under argon was 6 hours. This procedure is depicted in FIG. 4. In another experiment, a mixture of 2.5% $H_2$/97.5% Ar was evaluated.

Results

For each of the examples above, the gas composition was evaluated using gas phase FTIR after the purification vessel was put back into service (i.e., after the catalyst was regenerated using the Examples 1-4). In Examples 2-4, the levels of impurities (CO, $CO_2$, $H_2O$, HCl, $NH_3$) were below the detection limit of the FTIR as provided in the table above. When this purified gas was subsequently used in a fiber draw furnace, there was no detectable accelerated oxidation of the graphite materials used for the construction of the draw furnace.

Throughout this application, various publications are referenced. The disclosures of these publications in their entireties are hereby incorporated by reference into this application in order to more fully describe the compounds, compositions, and methods described herein.

Various modifications and variations can be made to the compounds, compositions, and methods described herein. Other aspects of the compounds, compositions, and methods described herein will be apparent from consideration of the specification and practice of the compounds, compositions, and methods disclosed herein. It is intended that the specification and examples be considered as exemplary.

The invention claimed is:

1. A method for regenerating a metal catalyst comprising exposing the metal catalyst to a hydrogenation composition comprising hydrogen gas and a first inert gas under heat having a first temperature, and further performing one or both of the following steps: (a) prior to exposing the metal catalyst to the hydrogenation composition, exposing the metal catalyst to a second inert gas in the absence of hydrogen gas, and (b) after exposing the metal catalyst to the hydrogenation composition, exposing the metal catalyst to a third inert gas in the absence of hydrogen gas.

2. The method of claim 1, wherein both steps (a) and step (b) are performed.

3. The method of claim 2, wherein the second inert gas and the third inert gas are, independently, argon, nitrogen, helium, or a mixture thereof.

4. The method of claim 3, wherein step (a) further comprises heating the metal catalyst to a temperature less than or equal to the first temperature in the presence of the second inert gas.

5. The method of claim 4, wherein the metal catalyst is heated from 0.5 hours to 2 hours.

6. The method of claim 4, wherein the first temperature is less than or equal to 300° C.

7. The method of claim 4, wherein step (b) further comprises cooling the metal catalyst to a temperature of 20° C. to 65° C. in the presence of the third inert gas.

8. The method of claim 7, wherein the metal catalyst is cooled from 1 hour to 4 hours.

9. The method of claim 7, wherein the second inert gas is argon and the third inert gas is argon or nitrogen.

10. The method of claim 1, wherein only step (b) is performed.

11. The method of claim 10, wherein step (b) further comprises cooling the metal catalyst to a temperature of 20° C. to 65° C. in the presence of the third inert gas.

12. The method of claim 11, wherein the metal catalyst is cooled from 1 to 4 hours.

13. The method of claim 11, wherein the third inert gas is argon or nitrogen.

14. The method of claim 10, wherein before the exposing the metal catalyst to a third inert gas, the metal catalyst is cooled to a temperature of 20° C. to 65° C., and wherein the exposing the metal catalyst to a third inert gas further includes heating the metal catalyst to a temperature of 180° C. to 300° C. in the presence of the third inert gas.

15. The method of claim 14, wherein the metal catalyst is cooled in the presence of the hydrogenation composition.

16. The method of claim 14, further comprising cooling the metal catalyst in the presence of the third inert gas.

17. The method of claim 1, wherein only step (a) is performed.

18. The method of claim 1, wherein the first temperature is less than or equal to 300° C.

19. The method of claim 1, wherein the metal catalyst is exposed to the hydrogenation composition for 1 to 48 hours.

20. The method of claim 1, wherein the hydrogen gas is present in the hydrogenation composition at a concentration less than or equal to 5 vol %.

21. The method of claim 1, wherein the hydrogen gas is present in the hydrogenation composition at a concentration of from about 0.5 vol % to about 5 vol %.

22. The method of claim 1, wherein the first inert gas is nitrogen.

23. The method of claim 1, wherein the metal catalyst comprises nickel, iron, copper, titanium, zirconium, palladium, a transition metal alloy, or any combination thereof.

24. The method of claim 1, wherein the metal catalyst is nickel.

25. The method of claim 1, wherein the metal catalyst is integrated into a catalyst bed comprising molecular sieves.

26. The method of claim 1, wherein the method is repeated two or more times.

* * * * *